United States Patent
Sakamoto et al.

(10) Patent No.: US 6,847,741 B2
(45) Date of Patent: Jan. 25, 2005

(54) OPTICALLY INDUCED TOTAL INTERNAL REFLECTION X-JUNCTION WAVEGUIDE OPTICAL SWITCH, NETWORK AND OPTICAL SWITCHING METHOD

(75) Inventors: Steven R. Sakamoto, Santa Clara, CA (US); Ralph Spickermann, Redwood City, CA (US)

(73) Assignee: Lockheed Martin Corp, Bethesda, MD (US)

( * ) Notice: Subject to any disclaimer, the term of this patent is extended or adjusted under 35 U.S.C. 154(b) by 61 days.

(21) Appl. No.: 10/264,609

(22) Filed: Oct. 4, 2002

(65) Prior Publication Data

US 2004/0066999 A1 Apr. 8, 2004

(51) Int. Cl.[7] ............................. G02B 6/26; G02F 1/313
(52) U.S. Cl. ................................. 385/5; 385/45; 385/22
(58) Field of Search .......................... 385/5, 45, 16–18, 385/21–22

(56) References Cited

U.S. PATENT DOCUMENTS

| | | | |
|---|---|---|---|
| 4,693,547 A | * | 9/1987 | Soref et al. .................... 385/16 |
| 5,133,027 A | * | 7/1992 | Funazaki et al. ............... 385/5 |
| 5,432,873 A | * | 7/1995 | Hosoya et al. ................. 385/21 |
| 6,493,478 B1 | * | 12/2002 | DeRosa et al. ............... 385/16 |

OTHER PUBLICATIONS

J. Yang et al. Polyimide–waveguide–based thermal optical switch using total–internal–reflection effect. Applied Physics Letters, vol. 81 No. 16, pp. 2947–2949, Oct. 2002.*

* cited by examiner

Primary Examiner—Rodney Bovernick
Assistant Examiner—Mike Stahl
(74) Attorney, Agent, or Firm—Kenneth W. Float

(57) ABSTRACT

Optical apparatus and optical switching methods that provide optical high data rate switching at a wavelength or packet level using optical tone addressing. Optical signal routing is a result of optically induced total internal reflection at the intersection of an X-junction waveguide structure. The total internal reflection effect is controlled by a high intensity optical pump beam separate from the optical data signal. Total internal reflection may result from a free-carrier induced change in refractive index, which is a nonlinear effect found in common III–V semiconductors and selected polymers. Optical switching networks may be formed using cascaded pluralities of optical waveguide switches.

12 Claims, 4 Drawing Sheets

OPTICALLY INDUCED TOTAL INTERNAL REFLECTION X-JUNCTION WAVEGUIDE OPTICAL SWITCH, NETWORK AND OPTICAL SWITCHING METHOD

BACKGROUND

The present invention relates generally to optical switches and switching methods, and more particularly, to X-junction waveguide optical switches, switch networks and optical switching method that permit optical high data rate switching at a wavelength or packet level using optical tone addressing.

Conventional all-optical nonlinear material approaches to implementing optical switches include (1) Fabry-Perot waveguide switches and retro-reflectors, (2) coaxially illuminated directional coupler waveguide switches, and (3) microring resonators. Other similar electronically actuated switches are known by the inventors to exist.

It is an objective of the present invention to provide for X-junction waveguide optical switches, switch networks and optical switching method that improve upon capabilities of conventional optical switching devices.

SUMMARY OF THE INVENTION

To meet the above and other objectives, the present invention provides for apparatus and methods that enable all-optical high data rate switching at the wavelength or packet level using optical tone addressing. More particularly, the present invention provides for an all-optical waveguide switch, which is a device that directs guided optical (data) signals as a result of optical control signal inputs, without the need for conversion between electrical and optical domains. Optical switching networks may be formed using cascaded pluralities of optical waveguide switches. Optical switching methods are also provided.

Optical signal routing in the present invention occurs using optically induced total internal reflection (TIR) at the intersection of an X-junction waveguide structure. The total internal reflection effect is controlled by a high intensity optical pump beam separate from the optical data signal. Total internal reflection can be the result of a free-carrier induced change in refractive index, which is a nonlinear effect found in common III–V semiconductors or selected polymers, for example. The all-optical switch, switch fabric and switching methods are compatible with optical tone addressing network schemes.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
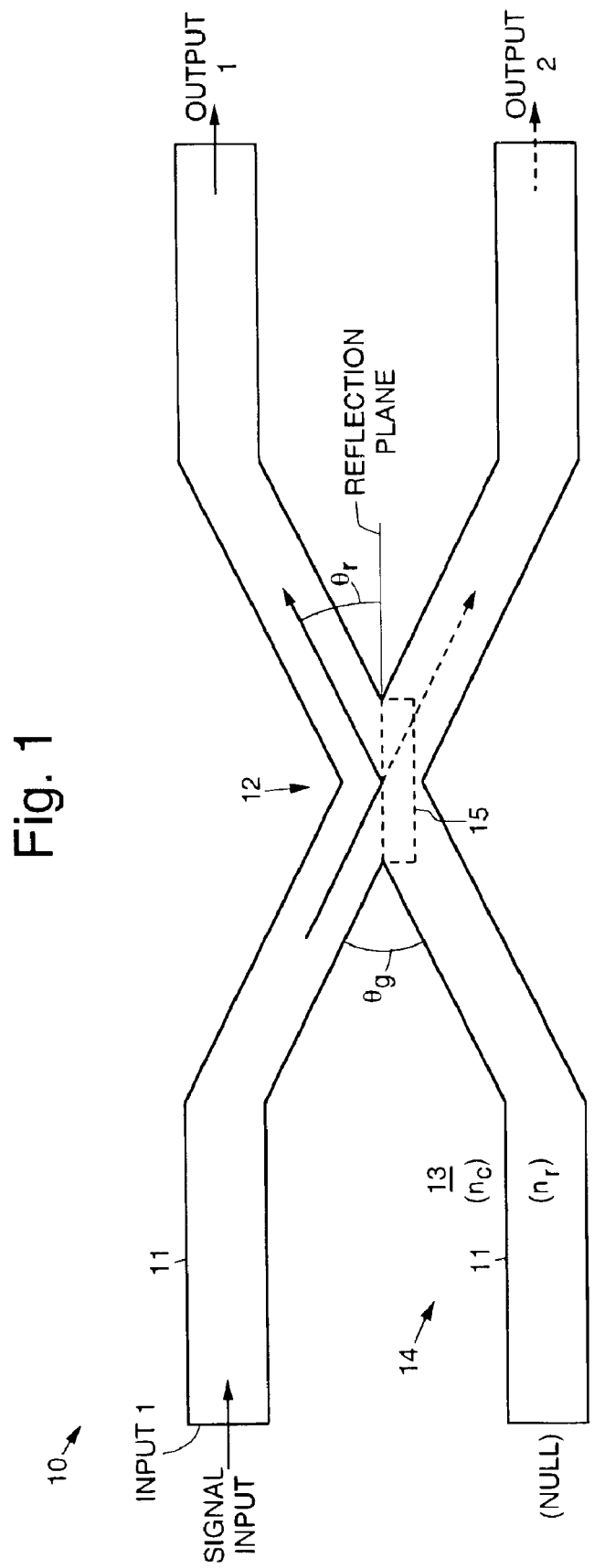
FIG. 1 is a schematic of an exemplary optical switch in accordance with the principles of the present invention.
Figure 2:
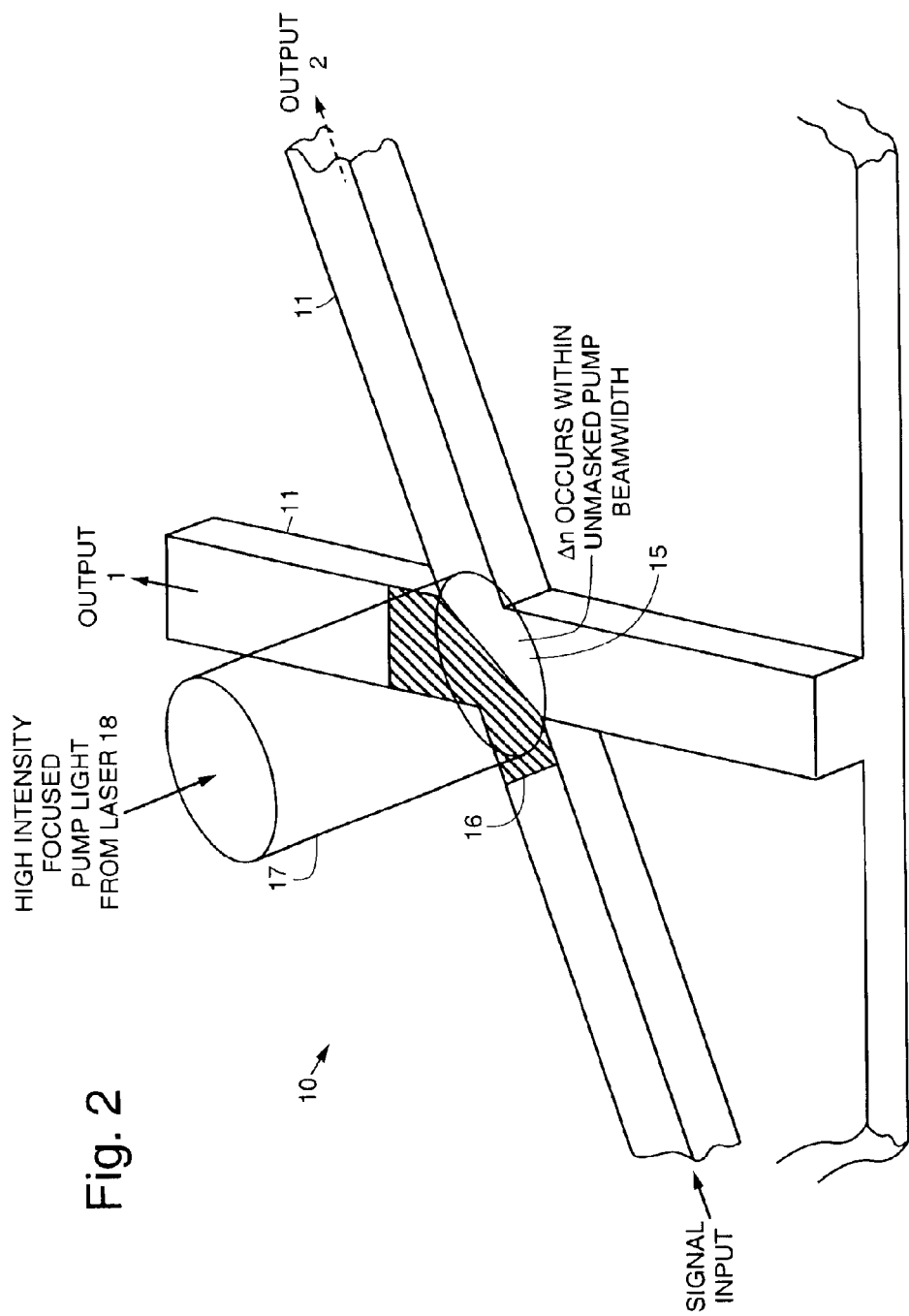
FIG. 2 illustrates activation of the present X-junction waveguide switch using a high intensity pump beam.

Referring to the drawing figures, FIG. 1 is a schematic of an exemplary optical switch 10 in accordance with the principles of the present invention. The exemplary optical switch 10 shown in FIG. 1 has a 1-input-by-2-output (1×2) port configuration. FIG. 2 illustrates activation of the X-junction waveguide switch 10 using a high intensity pump beam 17 (comprising an optical carrier), such as may be provided by a vertical cavity surface emitting laser 18, for example.

As is shown in FIG. 1, the exemplary optical switch 10 comprises a plurality of single mode optical ridge waveguides 11 intersecting at an angle $\theta_g$ between the waveguides 11 at an X-junction 12. The ridge waveguides 11 have a two-dimensional effective refractive index $n_r$, while cladding 13 in a surrounding field area 14 has two-dimensional refractive index $n_c$ such that $n_r > n_c$. An optical signal propagates with a mode effective index $n_m$, which is a weighted average of $n_r$ and $n_c$. An interaction region 15 illustrated by the dashed box in the center of the X-junction is where optical switching action occurs. The interaction region 15 may be activated by a high intensity pump beam 17 that illuminates the top-side of the interaction region 15 as is shown in FIG. 2.

Operation of the exemplary optical switch 10 shown in FIG. 1 follows, with reference also to FIG. 2. An optical signal is launched into an input port (Input 1) of one of the two waveguides 11 (the top left waveguide 11 in the case of FIG. 1). The optical signal travels down the single mode waveguide 11 until it reaches the X-junction 12 in the center. If the interaction region 15 is illuminated by the high intensity pump beam 17, the refractive index in the affected region 15 decreases by an amount Δn. The induced lower refractive index in the illuminated interaction region 15 creates a reflection plane (FIG. 1) for the incoming optical signal. Thus, the optical signal is totally internally reflected and directed towards the port labeled Output 1. If the optical pump beam 17 is absent, then no refractive index change occurs in the interaction region 15, and the input optical signal continues through the X-junction 12 unaffected, exiting via the port labeled Output 2.

The reflection angle ($\theta_r$) and the angle ($\theta_g$) between the waveguides 11 are limited by the critical angle of reflection, determined by Snell's law of reflection. Geometrically, the optical switch 10 shown in FIG. 1 is designed such that $\theta_g = 2\theta_r$. A larger $\theta_g$ reduces crosstalk between the output ports (Output 1, Output 2).

The interaction region 15 contains material with the capability of producing a negative refractive index change (Δn<0) when illuminated by high intensity light output by the high intensity pump beam 17. The index change as a result of optical pumping is known to be a nonlinear phenomena. The governing equation is:

$$\Delta n = I_p \cdot n_2$$

where $I_p$ is the optical pump intensity and $n_2$ is the nonlinear coefficient of the material comprising the interaction region 15.

III–V semiconductors and certain polymers are known to exhibit large values of $n_2$. Exemplary III–V semiconductor materials include bulk and multi-quantum well compositions of $In_xGa_{1-x}As_yP_{1-y}/InP$ and $Al_xGa_{1-x}As/GaAs$, for example. Exemplary polymers include polydiacetylenes derived from 2-methyl-4-nitroaniline (PDAMNA), for example. Semiconductors, in particular, can exhibit large nonlinearities due to optically generated free-carriers. The free-carriers can affect the index of refraction via band filling or by the plasma effect. Response times may be tailored (by adjusting material characteristics and properties) to be very fast (on the order of picoseconds). Tailoring may be achieved by doping the semiconductor with donor or acceptor atoms. An input optical signal is provided that has a low enough intensity so as to not activate a nonlinear effect in the waveguides 11.

It is possible to create the optical switch 10 entirely out of the same uniform material. In this switch 10, the interaction region 15 is comprised of the same material as the rest of the optical switch 10. In this type of switch 10, a finite pump beamwidth makes it necessary to accurately define the reflection plane, since all the material is subject to a Δn when it is top-side illuminated.

FIG. 2 is an enlarged view of the X-junction region 12 when observed at an oblique angle. A cross-hatched region 16 in FIG. 2 depicts a photo-lithographically defined metal mask 16 on top of the optical ridge waveguide 11. The purpose of the metal mask 16 is to block the pump beam 17 from illuminating the X-junction region 12 where the refractive index should remain unchanged. In other words, the exposed area within the pump beamwidth defines the interaction region 15, as pictured in FIG. 2, and Δn will only occur within the area of the pump beamwidth that is not masked by the metal mask 16.

The all-optical switch 10 is completely passive, and no electronics are needed to power it. In addition, if optical tone addressing is used as a network architecture, no controlling electronics or routers are required when the switch 10 is used as a core wavelength router. Optical-to-electrical conversions are also eliminated as a result. In general, the all-optical switch 10 reduces the cost, power and size of high speed wavelength routers/optical cross connects.

Figure 3:
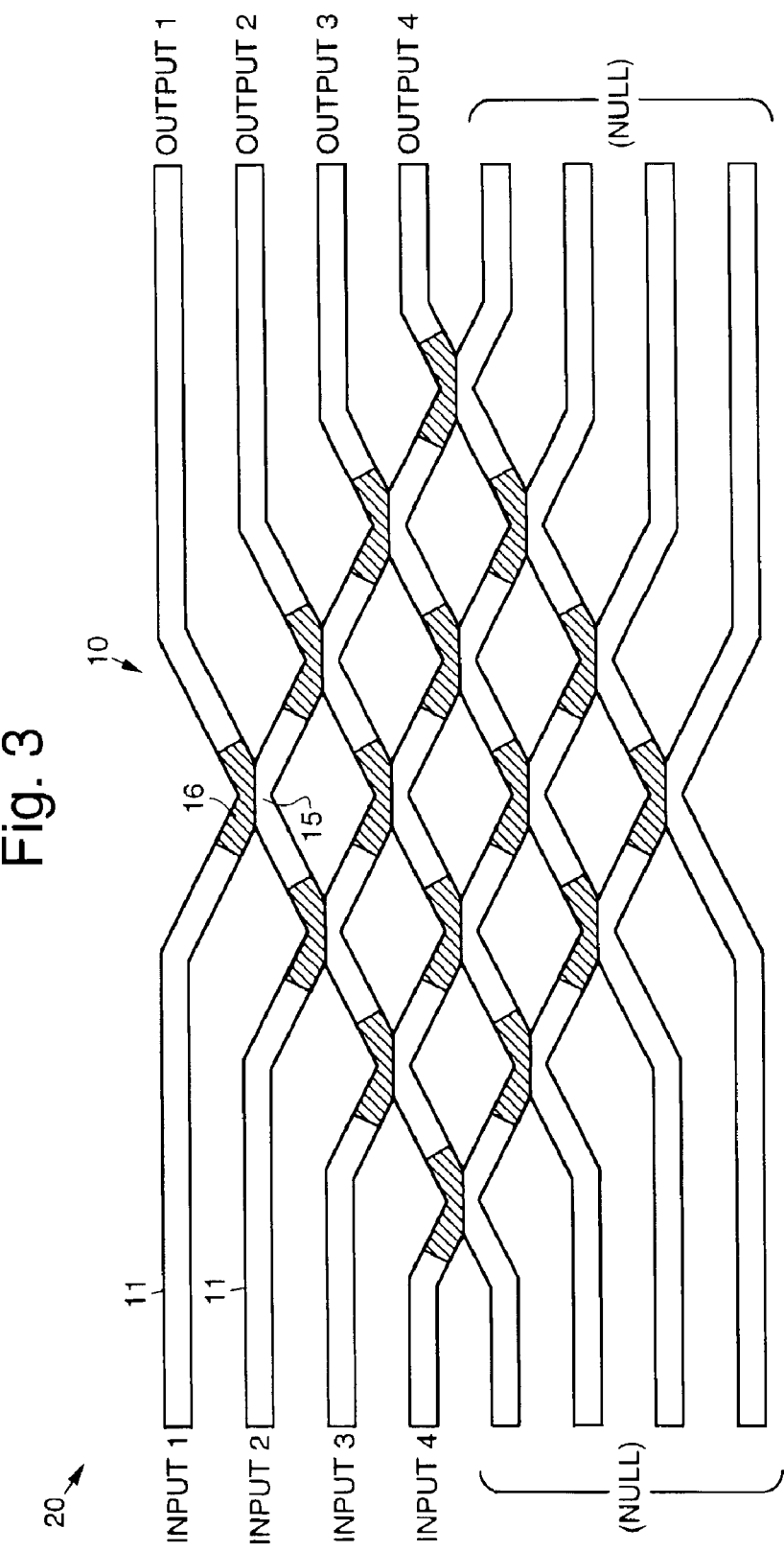
FIG. 3 illustrates a schematic of an exemplary 4×4 cascaded all-optical switch fabric or network in accordance with the principles of the present invention.

Optical waveguides 11 are typically very small, particularly semiconductor waveguides 11 designed for telecommunication wavelengths (on the order of a couple micrometers). This means the interaction regions 15 are small. Therefore, it is possible to cascade many of the 1×2 devices shown in FIG. 1 compactly into a larger matrix on a single integrated circuit chip. FIG. 3 is a schematic of a 4×4 cascaded all-optical switch fabric 20, matrix 20 or network 20 in accordance with the principles of the present invention. Scaling up to larger matrices 20 is simple and straightforward.

Note that the 4×4 example of the optical switch fabric 20 shown in FIG. 3 is non-blocking, wherein any input port can route signals to any output port, provided the output port is not already occupied. With such a layout, particularly for higher port counts, a matrix of vertical cavity surface emitting lasers (VCSELs) may be suspended and aligned above the plane of the cascaded switch fabric 20 to provide the required pump beams 17. An array of micro-lenses may be fabricated to tight tolerances and positioned directly between the lasers and the integrated circuit chip comprising the switch fabric 20 to maintain alignment between the many pump beams 17 and their corresponding interaction regions 15. This aids in packaging of the optical switch 10 and switch matrix 20.

The potential for greater than 100 GHz optical switching exists as a result of using the present optical switch 10. This is a result of how fast the nonlinear effect is, particularly in III–V semiconductors, for example. Synthesized polymers, such as conjugated poly(silylenearylene) and poly (aryleneethylenesilylene) in polymer matrices, for example, may also by used to fabricate even faster optical switches 10.

Figure 4:
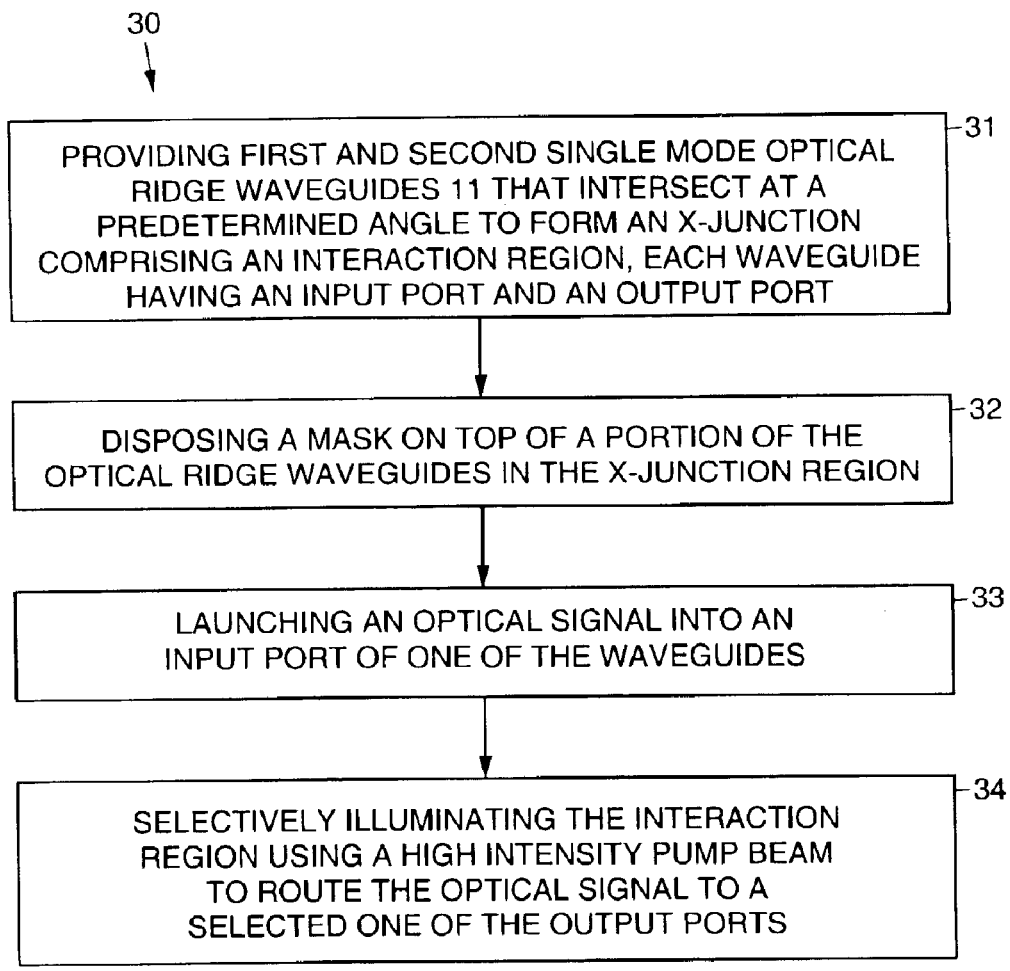
FIG. 4 is a flow diagram that illustrates an exemplary optical switching method in accordance with the principles of the present invention.

Referring to FIG. 4, it is a flow diagram that illustrates an exemplary optical switching method 30 in accordance with the principles of the present invention. The exemplary optical switching method comprising the following steps.

First and second single mode optical ridge waveguides 11 are provided 31 that intersect at a predetermined angle to form an X-junction 12 comprising an interaction region 15, each waveguide having an input port and an output port. A mask 16 is disposed 32 on top of a portion of the optical ridge waveguides in the X-junction region. An optical signal is launched 33 into an input port of one of the waveguides. The interaction region is selectively illuminated 34 using a high intensity pump beam 17 to route the optical signal to a selected one of the output ports.

The present invention provides for optical data routing that is optically actuated (as opposed to electronically actuated) by carrier-induced (pump beam) total internal reflection at the intersection of a completely passive, compact X-junction waveguide structure 12. The present invention is completely passive, very compact and is easily scalable, whereas conventional waveguide switches are not, especially electronic switches. The present invention has a larger wavelength range of operation compared to conventional narrow band reflectors, waveguide couplers and ring resonators, for example.

Thus, X-junction waveguide optical switches, switch networks and optical switching method have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Optical switch apparatus comprising:

first and second single mode optical ridge waveguides that intersect at a predetermined angle to form an X-junction comprising an interaction region;

a mask disposed on top of a portion but not all of the optical ridge waveguides in the X-junction region so as to cover the interaction region from a center line of the interaction region to its lateral edge; and apparatus for producing a high intensity pump beam that selectively illuminates the interaction region.

2. The optical switch apparatus recited in claim 1 wherein the apparatus for producing a high intensity pump beam comprises a vertical cavity surface emitting laser.

3. The optical switch apparatus recited in claim 1 wherein the apparatus for producing a high intensity pump beam comprises an edge emitting laser.

4. The optical switch apparatus recited in claim 1 wherein the optical waveguides comprise III–V semiconductor material.

5. The optical switch apparatus recited in claim 1 wherein the optical waveguides comprise polymer material.

6. The optical switch apparatus recited in claim 1 wherein the interaction region comprises III–V semiconductor material.

7. The optical switch apparatus recited in claim 1 wherein the interaction region comprises polymer material.

8. The optical switch apparatus recited in claim 1 wherein the optical ridge waveguides have a two-dimensional effective refractive index $n_r$, and cladding in a field area surrounding the optical ridge waveguides has two-dimensional refractive index $n_c$ such that $n_r > n_c$.

9. The optical switch apparatus recited in claim 1 wherein the apparatus for producing a high intensity pump beam illuminates a top-side of the interaction region.

10. The optical switch apparatus recited in claim 1 wherein an optical signal launched into one of the waveguides travels down the waveguide until it reaches the X-junction, and if the interaction region is illuminated by the high intensity pump beam, the refractive index in the interaction region is decreased to create a reflection plane for the optical signal and totally internally reflecting the optical signal and directing it towards a first output port, and if the optical pump beam is absent, then no refractive index change occurs in the interaction region, and the optical signal continues through the X-junction unaffected, exiting at a second output port.

11. The optical switch apparatus recited in claim 1 further comprising:

a plurality of cascaded single mode optical ridge waveguides that intersect at predetermined angles to form a plurality of X-junctions comprising interaction regions;

a plurality of masks disposed on top of a portion but not all of each of the optical ridge waveguides in respective X-junction regions that cover the respective interaction regions from a center line of the respective interaction region to its lateral edge; and apparatus for producing a plurality of high intensity pump beams that selectively illuminate respective ones of the interaction regions;

which apparatus comprises an optical switch fabric.

12. An optical switching method comprising the steps of:

providing first and second single mode optical ridge waveguides that intersect at a predetermined angle to form an X-junction comprising an interaction region, each waveguide having an input port and an output port;

disposing a mask on top of a portion but not all of the optical ridge waveguides in the X-junction region so as to cover the interaction region from a center line of the interaction region to its lateral edge;

launching an optical signal into an input port of one of the waveguides; and selectively illuminating the interaction region using a high intensity pump beam to route the optical signal to a selected one of the output ports.

* * * * *